United States Patent
Niesley et al.

(10) Patent No.: US 10,082,169 B2
(45) Date of Patent: Sep. 25, 2018

(54) CAPTIVE MOUNTING HARDWARE

(71) Applicant: ARRIS Enterprises LLC, Suwanee, GA (US)

(72) Inventors: Charles F. Niesley, Lansdale, PA (US); David M. Gargani, Lansdale, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 98 days.

(21) Appl. No.: 15/228,833

(22) Filed: Aug. 4, 2016

(65) Prior Publication Data

US 2017/0045076 A1  Feb. 16, 2017

Related U.S. Application Data

(60) Provisional application No. 62/204,544, filed on Aug. 13, 2015.

(51) Int. Cl.
| | | |
|---|---|---|
| *F16B 21/18* | (2006.01) | |
| *F16B 29/00* | (2006.01) | |
| *G06F 1/18* | (2006.01) | |
| *G11B 33/08* | (2006.01) | |

(52) U.S. Cl.
CPC .............. *F16B 29/00* (2013.01); *F16B 21/18* (2013.01); *G06F 1/187* (2013.01); *G11B 33/08* (2013.01)

(58) Field of Classification Search
CPC ........... F16B 21/18; F16B 29/00; F16B 35/00
USPC ....................................... 411/352, 371.2, 383
See application file for complete search history.

(56) References Cited

U.S. PATENT DOCUMENTS

| | | | | |
|---|---|---|---|---|
| 3,041,913 A | * | 7/1962 | Liska | F16B 5/0208 285/148.27 |
| 3,126,935 A | * | 3/1964 | Tuozzo | F16B 41/002 29/512 |
| 3,560,132 A | * | 2/1971 | Gulistan | F16B 35/00 29/512 |
| 3,770,036 A | * | 11/1973 | Sherman | F16B 19/002 411/508 |
| 4,889,457 A | * | 12/1989 | Hageman | F16B 31/028 411/10 |
| 5,017,068 A | * | 5/1991 | Cooksey | F16B 23/0061 403/282 |
| 6,722,052 B2 | * | 4/2004 | Wu | F16B 5/0208 33/613 |
| 6,802,656 B2 | * | 10/2004 | Arbuckle | F16M 11/06 348/143 |

(Continued)

*Primary Examiner* — Roberta S Delisle
(74) *Attorney, Agent, or Firm* — Bart A. Perkins

(57) ABSTRACT

In embodiments, a mounting bracket may facilitate an attachment of a first device to an enclosure of a second device. A shoulder screw may be inserted through a grommet which is mounted in a bracket, and the shoulder screw may be threaded into an opening within the first device. The grommet may have an axial through-hole with a counter bore. A portion of the shoulder screw may be threaded to mate with a threaded opening of the first device and may be designed to compress the grommet for secure mounting. A raised cylindrical section on the shoulder of the screw may be captured within the counter bore of the grommet when pressed into position and another raised section of the shoulder may prevent the screw from being pulled out of the counter bore when the screw is unthreaded from the corresponding opening of the first device.

8 Claims, 3 Drawing Sheets

(56) References Cited

U.S. PATENT DOCUMENTS

| | | | | |
|---|---|---|---|---|
| 6,874,985 B2* | 4/2005 | Hein | .................. | F16B 5/02 |
| | | | | 411/371.2 |
| 2002/0172574 A1* | 11/2002 | McCormack | ......... | F16B 5/0208 |
| | | | | 411/352 |
| 2010/0290864 A1* | 11/2010 | Wang | ................... | F16B 5/0208 |
| | | | | 411/383 |

* cited by examiner

CAPTIVE MOUNTING HARDWARE

CROSS REFERENCE TO RELATED APPLICATION

This application is a non-provisional application claiming the benefit of U.S. Provisional Application Ser. No. 62/204,544, entitled "Device Mount Using Shoulder Screw and Grommet," which was filed on Aug. 13, 2015, and is incorporated herein by reference in its entirety.

TECHNICAL FIELD

This disclosure relates to a system that allows flexibility and retention of mounting hardware components.

BACKGROUND

It is desirable to provide a system for mounting a storage device (e.g., Hard Disk Drive (HDD)) in such a way as to minimize shock and vibration, to prevent possible damage to the storage device, as well as to lessen noise levels outside of an enclosure. Typical mounting systems involve multiple components that may become separated from each other and/or require special tools for assembly. Therefore, a need exists for a system that provides a secure and shock/vibration resistant mounting of a storage device to another device (e.g., gateway housing) and that facilitates an installer's ability to remove, replace and/or reinstall the storage device without misplacing components of the mounting system and without requiring the use of tools.

BRIEF DESCRIPTION OF THE DRAWINGS

Like reference numbers and designations in the various drawings indicate like elements.

DETAILED DESCRIPTION

Figure 1:
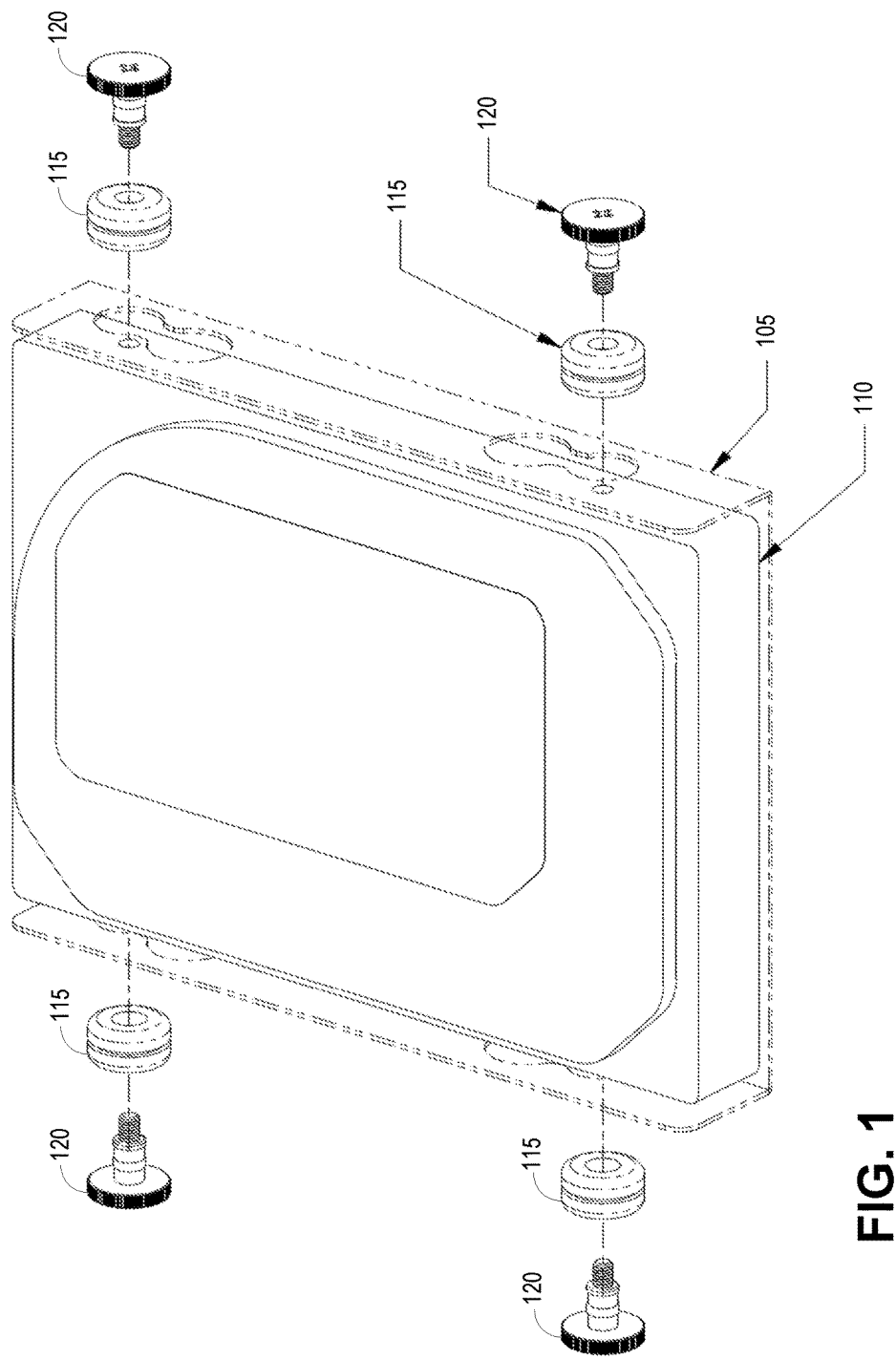
FIG. 1 shows an example embodiment of mounting hardware used to attach a mounting bracket to a component device.

In embodiments, a system described herein includes a pliable grommet featuring a counter bore and a shoulder screw with a raised cylindrical section on the shoulder. Features of the mounting system prevent the shoulder screw from being easily separated from the grommet, but allow free movement inward so the screw can be screwed and unscrewed into a storage device for attachment inside a housing.

In embodiments, the system described herein facilitates the replacement of a storage device inside an enclosure wherein no specialized tools are required. The mounting hardware used for installation of the storage device remains attached to the internal structure of the mounting system described herein, thereby eliminating the possibility that the installer could fail to reinstall the hardware or inadvertently misplace hardware inside the enclosure.

As an example embodiment, an HDD (e.g., standard 3.5 inch form factor HDD) may include two tapped holes (e.g., #6-32 UNC-2B) on each side for mounting purposes. Utilizing these holes, a shoulder screw may be inserted through a grommet which is mounted in a bracket. The bracket may be made from sheet metal or another thin, rigid material. The grommet may be made from a pliable material such as a thermoplastic elastomer, and may be used to provide shock and vibration isolation for the hard drive. The grommet may be designed with an outer groove so that it is retained in a suitably sized hole in the bracket. The grommet may have an axial through-hole with a counter bore. A shoulder screw with a thread to mate with a standard HDD threaded hole (e.g., a #6-32 UNC-2A) may be designed to provide proper compression of the grommet for secure mounting. A raised cylindrical section on the shoulder of the screw may be captured within the counter bore of the grommet when pressed into position. The outer surface of the shoulder screw may be knurled for increased grip when finger tightening or loosening the screw.

An embodiment of the invention described herein may include a system for mounting a first device to an enclosure of a second device, the system comprising: (a) a grommet comprising a top opening, a bottom opening, and an interior cylindrical cavity, wherein the grommet is affixed to a mounting bracket attached to the second device; (b) a shoulder screw comprising a knob, a shoulder section, and a threaded section, wherein: (i) the shoulder section comprises an upper raised section and a lower raised section, the upper raised section having rounded top and bottom edges and the lower raised section having a rounded bottom edge and a squared top edge; (ii) the outside diameters of the upper raised section and the lower raised section are greater than the outside diameter of the shoulder section and the inside diameter of the top opening of the grommet; and (iii) the threaded section comprises thread that corresponds with a threaded opening on the first device.

According to an embodiment of the invention, the first device comprises a storage device.

According to an embodiment of the invention, the second device comprises a set-top box.

According to an embodiment of the invention, the knob comprises an oversized knob having an outside diameter that is greater than the outside diameter of the shoulder.

According to an embodiment of the invention, the outer radial surface of the knob is knurled.

According to an embodiment of the invention, the inside diameter of the top opening of the grommet and the outside diameter of the shoulder are equivalent when the grommet is in an uncompressed state.

According to an embodiment of the invention, the grommet is made of a pliable material such that the upper raised section of the shoulder may be passed through the top opening of the grommet to within the interior cylindrical cavity of the grommet when the threaded section of the shoulder is mated with the threaded opening of the first device.

According to an embodiment of the invention, the top opening, the bottom opening, and the interior cylindrical cavity of the grommet form a counter bore.

FIG. 1 shows an example embodiment of mounting hardware used to attach a mounting bracket 105 to a component device 110. The component device 110 may be a storage component (e.g., digital video recorder (DVR) storage such as a HDD). The mounting hardware may include one or more grommets 115 and one or more shoulder screws 120. In embodiments, a shoulder screw 120 may be passed through a grommet 115 and an opening within the mounting bracket 105, and threads of the shoulder screw 120 may be mated with a threaded opening on the component device 110. The shoulder screw 120 may be finger tightened to compress the grommet 115 against the outer surface of the component device 110, thereby providing a shock/vibration resistant mounting of the component device 110 to an enclosure of another device (e.g., set-top box (STB), gateway housing, etc.).

Figure 2:
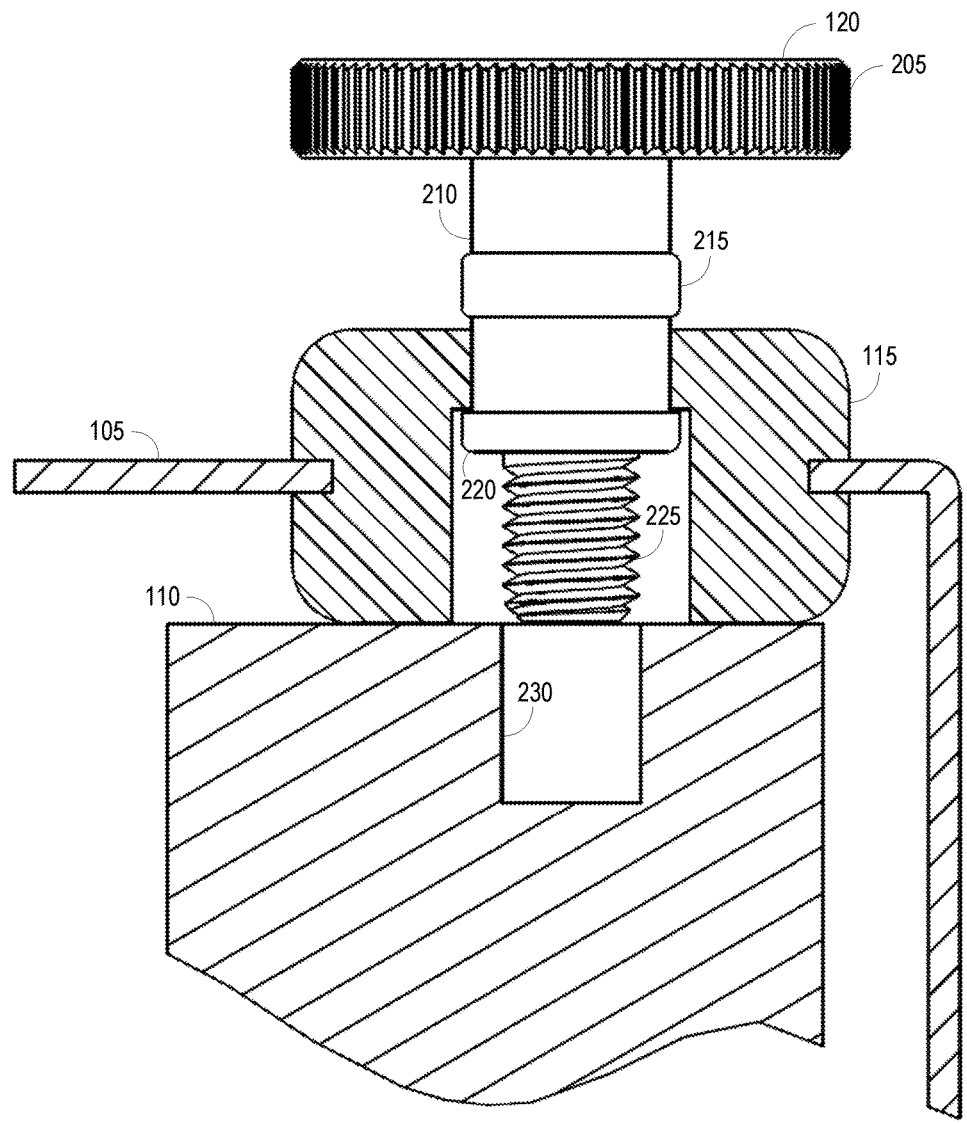
FIG. 2 shows an example embodiment of mounting hardware in a disengaged state to allow removal of the component device from a mounting bracket.

FIG. 2 shows an example embodiment of mounting hardware in a disengaged state to allow removal of the component device 110 from a mounting bracket 105. In embodiments a shoulder screw 120 may include an oversized knob 205, a shoulder 210, a first raised shoulder section 215, a second raised shoulder section 220, and a threaded section 225.

In embodiments, the oversized knob 205 may be round and may have a large enough diameter to allow finger tightening and loosening of the shoulder screw 120. The outer circumference of the oversized knob 205 may be knurled to provide a gripping surface for a user when tightening/loosening the shoulder screw 120.

In embodiments, the shoulder 210 may be dimensioned so as to allow the threaded section 225 to be completely removed from a threaded opening 230 (e.g., the threaded opening of the component device 110) while also allowing the first raised shoulder section 215 to be positioned within an opening (e.g., counter bore) of the grommet 115 when the threaded section 225 is mated with the threaded opening 230. The first raised shoulder section 215 and the second raised shoulder section 220 may be spaced along the shoulder 210 in such a way as to allow the top edge of the first raised shoulder section 215 to be positioned within the opening of the grommet 115 when the threaded section 225 is mated with the threaded opening 230, and to allow the top edge of the second raised shoulder section 220 to lie flush with the upper interior surface of the opening of the grommet 115 when the threaded section 225 is completely removed from the threaded opening 230. For example, the outside diameters of the first raised shoulder section 215 and the second raised shoulder section 220 may be greater than the outside diameter of the shoulder section 215 and the inside diameter of the opening at the top surface of the grommet 115.

In embodiments, the top and bottom edges of the first raised shoulder section 215 may be rounded to allow the first raised shoulder section 215 to pass into and out of the counter bore area of the grommet 115 (e.g., a cylindrical cavity within the grommet 115) through an opening on the top surface of the grommet 115. The top edge of the second raised shoulder section 220 may be flat (e.g., squared) to prevent the second raised shoulder section 220 from passing through the opening on the top surface of the grommet 115. The opening on the top surface of the grommet 115 may be circular and may have an inside diameter that is equivalent to the outside diameter of the shoulder 210. The grommet 115 may be made of a flexible material so that the opening of the grommet 115 may compress and allow the larger diameter first raised shoulder section 215 to pass through.

In embodiments, the spacing of the first raised shoulder section 215 and the second raised shoulder section 220 and the depth of the grommet 115 opening (e.g., counter bore) may be coordinated such that the top edge of the first raised shoulder section 215 is positioned within the opening of the grommet 115 when the threaded section 225 is mated with the threaded opening 230.

In embodiments, the grommet 115 may be placed within a designated opening in the mounting bracket 105 and the bottom surface of the grommet 115 may be placed flush against an outer surface of the component device 110.

Figure 3:
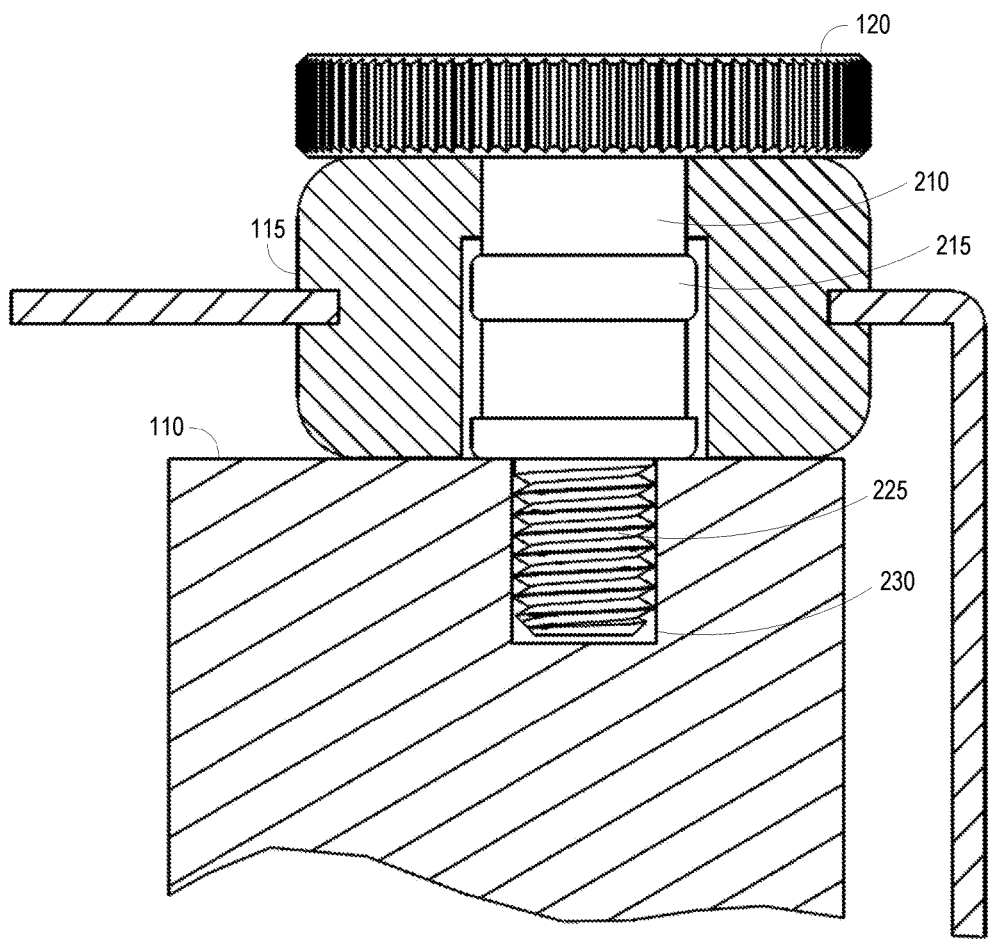
FIG. 3 shows an example embodiment of mounting hardware in an engaged state wherein the shoulder screw compresses the grommet against the surface of the component device when the threaded section is mated with the threaded opening.

FIG. 3 shows an example embodiment of mounting hardware in an engaged state wherein the shoulder screw 120 compresses the grommet 115 against the surface of the component device 110 when the threaded section 225 is mated with the threaded opening 230. The length of the shoulder 210 may be dimensioned so as to allow a desired amount of compression to be placed on the grommet 115 when the mounting hardware is in an engaged state.

The top edge of the first raised shoulder section 215 may be rounded to allow the first raised shoulder section 215 to pass through the opening of the grommet 115 when the mounting hardware is disengaged by unscrewing the threaded section 225 from the threaded opening 230.

It should be understood that while a storage device and a mounting bracket are used to describe the components being attached via the mounting hardware described herein, it is not intended to limit the subject matter of this disclosure to only the attachment of a mounting bracket to a storage device. Rather, the shoulder screw and grommet as described herein may be used in the attachment of a wide variety of components.

It is, of course, not possible to describe every conceivable combination of components or methodologies for purposes of describing the claimed subject matter, but one of ordinary skill in the art can recognize that further combinations and permutations of such matter are possible. Accordingly, the claimed subject matter is intended to embrace all such alterations, modifications and variations that fall within the spirit and scope of the appended claims.

We claim:

1. A system for mounting a first device to an enclosure of a second device, the system comprising:
    a grommet comprising a top opening, a bottom opening, and an interior cylindrical cavity, wherein the grommet is affixed to a mounting bracket attached to the second device;
    a shoulder screw comprising a knob, a shoulder section, and a threaded section, wherein:
    the shoulder section comprises an upper raised section and a lower raised section, the upper raised section having rounded top and bottom edges and the lower raised section having a rounded bottom edge and a squared top edge;
    the outside diameters of the upper raised section and the lower raised section are greater than the outside diameter of the shoulder section and the inside diameter of the top opening of the grommet;
    the shoulder section is located between the knob and the upper raised section; and
    the threaded section comprises thread that corresponds with a threaded opening on the first device.

2. The system of claim 1, wherein the first device comprises a storage device.

3. The system of claim 1, wherein the second device comprises a set-top box.

4. The system of claim 1, wherein the knob comprises an oversized knob having an outside diameter that is greater than the outside diameter of the shoulder.

5. The system of claim 1, wherein the outer radial surface of the knob is knurled.

6. The system of claim 1, wherein the inside diameter of the top opening of the grommet and the outside diameter of the shoulder are equivalent when the grommet is in an uncompressed state.

7. The system of claim 1, wherein the grommet is made of a pliable material such that the upper raised section of the shoulder may be passed through the top opening of the grommet to within the interior cylindrical cavity of the grommet when the threaded section of the shoulder is mated with the threaded opening of the first device.

8. The system of claim 1, wherein the top opening, the bottom opening, and the interior cylindrical cavity of the grommet form a counter bore.

\* \* \* \* \*